United States Patent [19]

Nakatani

[11] 4,166,239
[45] Aug. 28, 1979

[54] ROLL FILM DRIVE CONTROL ARRANGEMENT

[75] Inventor: Keiji Nakatani, Machida, Japan

[73] Assignee: Minolta Camera Kabushiki Kaisha, Azuchi, Japan

[21] Appl. No.: 867,176

[22] Filed: Jan. 5, 1978

[30] Foreign Application Priority Data

Jan. 17, 1977 [JP] Japan .............................. 52-4492[U]

[51] Int. Cl.² .............................................. H02P 3/08
[52] U.S. Cl. .................................... 318/266; 318/434; 318/477
[58] Field of Search ....................... 318/476, 474, 6, 7, 318/264–267, 272, 434, 466–469, 477

[56] References Cited
U.S. PATENT DOCUMENTS

| 3,199,910 | 8/1965 | Bradley | 318/477 X |
| 3,525,481 | 8/1970 | Longland | 318/6 X |
| 3,845,373 | 10/1974 | Totsu et al. | 318/434 |
| 3,931,557 | 1/1976 | Osburn | 318/434 |

Primary Examiner—J. V. Truhe
Assistant Examiner—W. E. Duncanson, Jr.
Attorney, Agent, or Firm—Wenderoth, Lind & Ponack

[57] ABSTRACT

Drive control arrangement for roll film having an end attached to a reel shaft and in which an increase in the load imposed on a reel drive motor caused by increased tension in the film when the attached end of the film is reached during film unwinding, or rewinding, is detected by a detection means which in response to the load increase produces an output causing the motor power supply circuit to open, whereby movement of the film is stopped, and risk of damage to the film or the drive system is avoided. The invention offers the advantage that no special marking of the film is required, and that the drive means is easily associated with conventional film drive systems.

10 Claims, 5 Drawing Figures

ROLL FILM DRIVE CONTROL ARRANGEMENT

BACKGROUND OF THE INVENTION

The present invention relates to a driving means for a tape-like material such as a roll film. More particularly the invention relates to a control arrangement for driving roll film which is used in microreaders or similar equipment and is of the type having at least one end fixed to a reel shaft.

An important aspect of control of unwinding and forwarding of roll film, is the detection of the end of the film, since if the end of the film is not detected there is a risk of unwinding the film too much to permit subsequent rewinding of the film. Detection of the film end is particularly important when the film end is fixed to the shaft of a film reel, and when a motor, whether controlled manually of automatically, is employed, since in such cases failure to detect the film end may result in breakage of the film, damage to the drive system, or other trouble such as overheating of the drive motor.

There have accordingly been proposed many means for detection of the end of film being unwound. In a typical conventional means, for example, there is provided a special mark near the end of a film and a detector stops the film unwinding drive system upon detection of this mark. Alternatively, as disclosed, for example, in Japanese Patent publication No. 46-43186, marks are provided in the roll film for detection of respective frames, and on the basis of the time elapsing between such marks and the time period set by a timer means, the trailing end of the roll film is detected when the particular mark is not detected for a time period more than a predetermined period of time. More specifically, if after detection of one mark, another mark is not detected within the set time, it is presumed that the film end has been reached and unwinding of film is stopped. According to another known means disclosed, for example, in Japanese Laid Open Patent Application No. 49-62126, there are provided, in a roll film, frame count slits and a transparent strip for detection of a frame position, which are detected by separate photodetection means which detect the trailing end of the film if signals representing both the detection strip and a frame count slit are not simultaneously received.

All of these conventional means have the disadvantages that they require an extra step in the manufacture of the film, to make requisite marks or slits, and also that each type of means is not employable with film which has not been specially manufactured.

Moreover, in the conventional trailing edge detecting mechanisms utilizing marks and the like, in addition to the inconveniences as described above, it is necessary to shift or reform such marks for addition or editing of the film, requiring extremely troublesome procedures in actual use, while the known arrangements utilizing timer mean have serious disadvantages such as that the time for which the timer means is set must inevitably be altered every time the feeding speed of the roll film is changed.

It is accordingly the principal object of the invention to provide a roll film drive control arrangement which, in driving of a roll film having at least one end fixed to a film reel shaft, automatically detects the film end and stops film unwinding, but does not require any special preparation of the film and so is employable in association with all types of roll film.

It is another object of the invention to provide a roll film drive control arrangement of the above described type which functions accurately and includes a control circuit portion which may easily be provided as a separate unit.

It is a further object of the present invention to provide a roll film drive control arrangement of the above described type which is simple in construction and can be readily incorporated into a conventional roll film drive arrangement at low cost.

SUMMARY OF THE INVENTION

In accomplishing these and other objects, there is provided, according to the present invention, a roll film drive control arrangement in which the power supply circuit for actuation of a motor to drive roll film reel means is opened or closed by a switch means in a control circuit which also includes detection means for detecting a variation of the load imposed on the drive motor. During forwarding of roll film having an end fixed to the shaft of an unwinding reel, when the end of the film is reached there is a sudden increase in the load imposed on the motor. In the arrangement of the invention, upon detection of this increase by the detection means, the detection means produces a signal to open the above-mentioned switch means, thus resulting in opening of the drive motor power supply circuit and stopping of the motor and film unwinding.

According to different embodiments of the invention, the detection means may comprises a means which supplies a voltage input proportional to current flowing in the armature of the drive motor to a comparator which, when this input is greater than a reference input, produces an output to trigger a thyristor which thereupon switches off a transistor in series with a relay.

Alternatively, the thyristor may be triggered by a photocoupler or reed relay means directly in response to an increase in current in the drive motor armature. Also, according to another embodiment of the invention, winding of the film is stopped automatically in the rewinding as well as the unwinding direction.

BRIEF DESCRIPTION OF THE DRAWING

A better understanding of the present invention may be had from the following full description of several preferred embodiments thereof when read in reference to the attached drawings, in which like numbers refer to like parts, and in which.

DETAILED DESCRIPTION OF THE INVENTION

Figure 1:
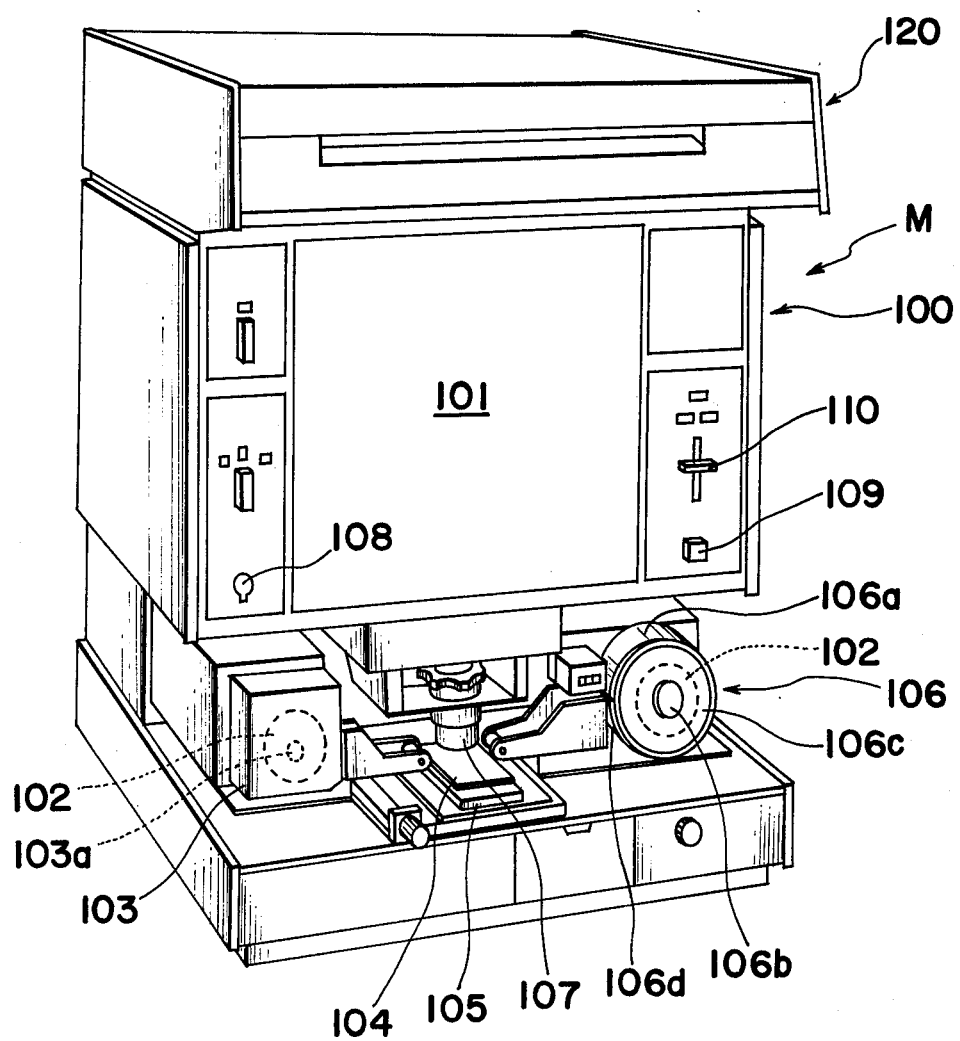
FIG. 1 is a perspective view showing the construction of a reader printer to which the present invention may be applied.

Referring now to FIG. 1, there is shown a reader printer M to which the present invention may be applied. The reader printer M generally includes a microreader portion 100 and a printer portion 120 with a power switch 108, print switch 109 and exposure adjusting knob 110, etc., being provided, and in the microreader portion 100 for projecting images or data on a roll film 102 onto an observation screen 101. The roll film 102 is accommodated in a cartridge 103 in a wound state and is mounted at the left hand portion of the reader printer M in a position below the screen 101. The leading end of the roll film 102 is drawn out of the cartridge 103 and is wound on a take-up reel 106 disposed at the right hand side of the reader printer M in a position corresponding to the cartridge 103 after passing between light transmitting plates 104 and 105, for example, of glass material in a known manner, the detailed description of which is omitted here for brevity. Feeding of the roll film 102 is suspended when a desired frame of the film 102 detected by a suitable means has reached the position between the plates 104 and 105, while the particular frame is subjected to light projected from the under side by a light source (not shown), with the images of said frame being projected onto the screen 101 by a projecting lens assembly 107 through an optical system (not shown) including reflecting mirrors, etc. In the arrangement shown in FIG. 1, the roll film 102 is, at one end thereof, fixed to or held by a rotary shaft 103a within the cartridge 103 so that it is prevented from disengagement therefrom. The take-up reel 106 includes a fixed cylindrical outer case 106a and a pair of reel blades 106c fixed in spaced relation to a rotary shaft 106b to cover opposite sides of the outer case 106a, so that the leading end of the roll film 102 from the cartridge 103 enters the outer case 106a through an inlet opening 106d formed in the outer periphery of the case 106a and is held between the pair of reel blades 106c to be wound up on the rotary shaft 106b. In FIG. 1, the drive for drawing the roll film 102 out of the cartridge 103 is controlled by controlling the drive of the take-up reel 106, while the drive for rewinding is controlled by controlling the drive the cartridge 103 through suitable clutch means (not shown).

Figure 2:
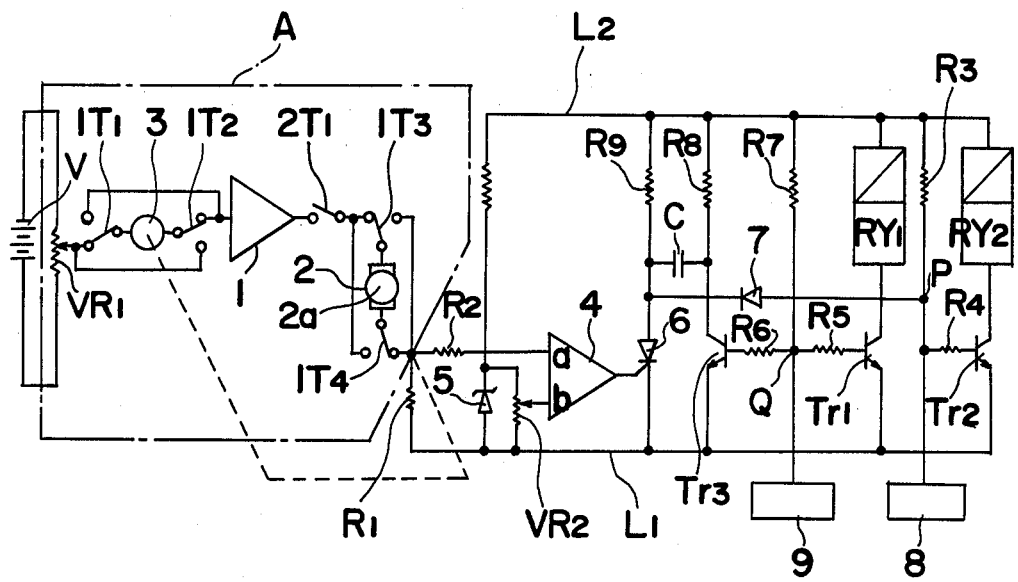
FIG. 2 is an electrical circuit diagram of a first embodiment of a roll film drive control arrangement of the invention.

Referring now to FIG. 2, the phantom line encloses a conventional drive control circuit A, in which voltage from a suitable DC source V, is set at a requisite value by a speed setting variable resistor VR1 and supplied through a switching contact 1T1, a motor detector 3, which serves to supply to the control circuit A feedback indicative of the speed of a film reel drive motor 2, and a switching contact 1T2 connected to an amplifier 1. Input to the amplifier 1 is thus varied in accordance with the setting of the variable resistor VR1 and feedback from the speed detector 3. When a normally open on-off control switch 2T1 is closed, output from the amplifier 1 is supplied to the armature 2a of the reel drive motor 2, in a direction determined by the positions of switching contacts 1T3 and 1T4. The switching contacts 1T1, 1T2, 1T3, and 1T4 are each switchable to one of two positions, are normally in the positions shown in the drawing, and each is switched to its other switching position upon actuation of a relay RY1. When the switching contacts 1T1 to 1T4 are in the normal positions shown in the drawing, the current flowing through the armature 2a is such that the reel drive motor 2 is driven in the direction for forward winding of a film. The on-off control switch 2T1 is controlled by a relay RY2.

Current flowing in the armature 2a flows through a resistor R1 to a power line L1 of the control circuit shown on the right of the drawing, and is also supplied across a resistor R2 to an input terminal a of a two-input terminal comparator 4, input to the terminal a thus being proportional to the current flowing through the armature 2a. Input to the other input terminal, i.e., terminal b of the comparator 4 is supplied via the slider of a variable resistor VR2, the one end of which is connected to the power line L1 and the other end of which is connected to the junction between the cathode of a zener diode 5 and a power line L2, the control circuit elements described below being connected across the power lines L1 and L2, and the anode of the zener diode 5 being connected to the power line L1. The output of the comparator 4 is supplied to the gate of a thyristor 6, and is low when the input to terminal a is lower than the input of the input terminal b, and becomes high and triggers the thyristor 6 when the input to the input terminal a is higher than the input to the terminal b.

The cathode of the tyristor 6 is connected to the power line L1, and the anode thereof is connected to one plate of a capacitor C, and through a resistor R9 to the power line L2, and through a diode 7 to a point P. The other plate of the capacitor C is connected to the junction of the one end of a resistor R8, the other end of which is connected to the power line L2, and to the collector of an NPN transistor TR3, the emitter of which is connected to the power line L1 and the base of which is connected through a resistor R6 to a point Q.

The point Q is also connected to a signal emitter 9, which is externally actuable to supply signals to cause reverse or forward actuation of the film reel motor in a manner described below, through a resistor R7 to the power line L2, and through a resistor R5 to the base of the NPN transistor Tr1, the collector of which is connected through the relay RY1 to the power line L2, and the emitter of which is connected to the power line L1.

The above-described point P is connected through a resistor R3 to the power line L2, and through a resistor R4 to the base of an NPN transistor Tr2, the collector of which is connected through relay RY2 to the power line L2, and the emitter of which is connected to the power line L1. The base of the transistor Tr2 is also connected through a resistor R4 to an externally actuable signal emitter 8 for emission of signals to open or close the power supply circuit of the reel drive motor.

In the above-described circuit, when forwarding of a film is to be effected, a "forward" signal is caused to be emitted by the signal emitter 9, whereby the voltage level at the point Q is made low, the transistors Tr1 and Tr3 are both made non-conductive, the relay RY1 is unactuated, and the contacts 1T1 to 1T4 are in the positions shown in the drawing. A signal caused to be emitted from the on-off signal emitter 8 causes voltage at the point P to become high for making the transistor Tr2 conductive, and actuating the relay RY2 to cause the contact 2T1 to close, whereupon the film reel motor is actuated to wind the film forward.

If the value of the resistor R2 and the setting of the variable resistor VR2 are suitably selected, during forward winding of the main portion of the film, the input to the terminal a of the comparator 4 remains lower than the input to the input terminal b thereof and the output of comparator 4 remains low, the thyristor 6 is untriggered, and the above-described conditions for forwarding of the film are maintained. When, however, the end of the film is reached, since the end of the film is fixedly attached to an unwinding reel, the load on the reel drive motor is suddenly increased, and maintenance of the same motor speed demands an increase of current through the armature 2a which causes the input at the input terminal a of the comparator 4 to become greater than the input to the comparator input terminal b. The output of the comparator 4 therefore becomes high and triggers the thyristor 6. As the thyristor 6 is now conductive, the capacitor C is charged, and also the voltage level at the point P becomes low, whereby the transistor Tr2 is turned off, the relay RY2 is de-energized, and the contact 2T1 is opened, thus cutting off supply of electricity to the reel drive motor, and stopping forward wind-up of the film.

Stopping of the forward wind-up of the film is indicated by suitable means, not shown, to an operator, who can then actuate the signal emitter 9 for emission of a "reverse" signal. When such a "reverse" signal is emitted, voltage level at the point Q becomes high, the transistors Tr1 and Tr3 are turned on, and the relay RY1 is actuated, thus causing the switching contacts to move to the positions opposite those shown in the drawing, and at the same time, as the transistor Tr3 is now conductive, voltage charged in the capacitor C is discharged, thus making the anode voltage of the thyristor 6 zero and preventing the thyristor 6 from conducting, and the voltage level at the point P again becomes high, whereby the transistor Tr2 is made conductive, the relay RY2 is actuated, the contact 2T1 is closed, and the reel motor is again actuated, but in reverse, to cause rewinding of the film, since the contacts 1T1 to 1T4 have been switched over.

Thus, the invention provides a roll film drive control arrangement which automatically stops the film when the film end is reached and which, since it does not require any preparation of special marks, etc. on the film, can be used with any type of roll film. It will also be noted that the control circuit in the right-hand portion of FIG. 2 may easily be connected to a conventional film drive motor circuit, there simply being required a single connection to obtain an indication of current flowing in the armature of the motor.

Figure 3:
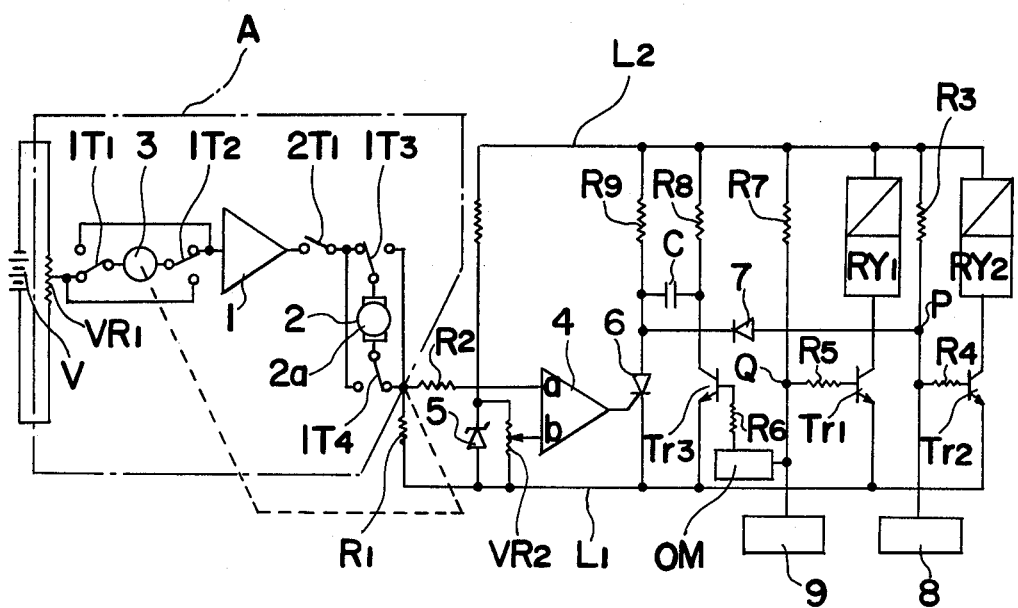
FIGS. 3, 4 and 5 are diagrams similar to FIG. 2, but particularly showing modifications and other embodiments thereof.

Referring to FIG. 3, if both ends of the film are attached to reel shafts, winding of the film both when it almost completely unwound and when it is almost completely rewound can be stopped by a circuit which comprises the same elements as shown in FIG. 2 and further includes a one-shot multivibrator OM provided in the circuit between the transistors Tr3 and Tr1 in a position such that signals from the forward-reverse wind changeover signal emitter 9 are supplied to the transistor Tr1 via the resistor R5 and to the transistor Tr3 via the one-shot multivibrator OM and the resistor R6.

In the circuit of FIG. 3, each time output from the signal emitter 9 goes from high to low or from low to high, the transistor Tr3 is made conductive by the input from the one-shot multivibrator OM, but only for a time sufficient to permit discharge of the capacitor C. In unwinding of the film, therefore, when the film end is reached, the thyristor 6 is triggered and the drive motor stopped, as described above. When a high signal is caused to be emitted by the signal emitter 9, in order to permit rewinding of the film, the transistor Tr1 is made conductive and remains conductive to actuate the relay RY1, whereas the transistor Tr3 conducts sufficiently to permit the capacitor C to be discharged, and so stop conduction of the thyristor 6, but stops conducting shortly after this action is effected. In other words, the thyristor 6 may now be triggered again in response to an increase of current in the armature 2a, and cause the motor power supply circuit to open when the film has been almost completely rewound.

Figure 4:
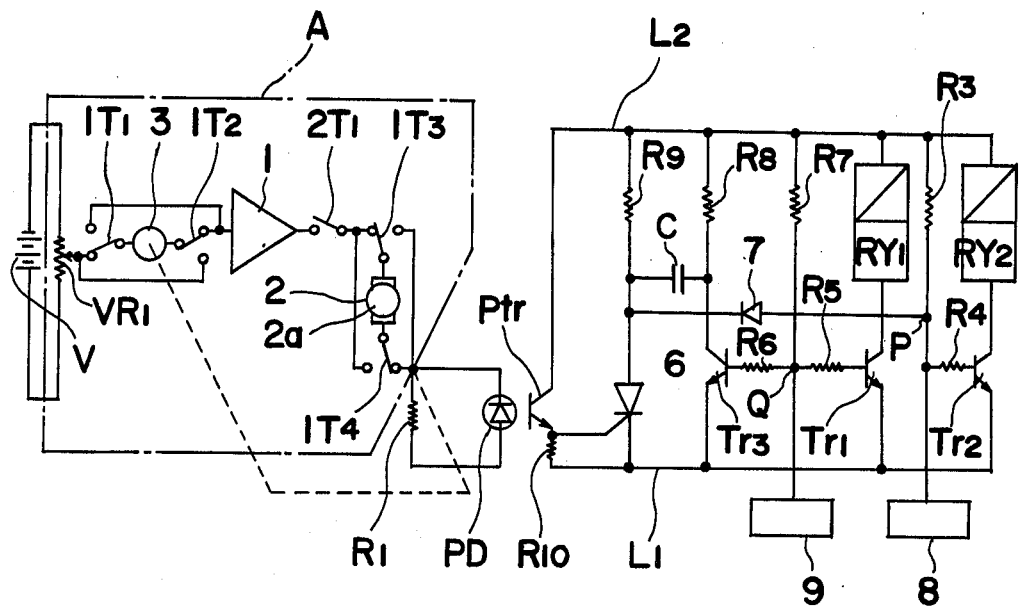

Referring now to FIG. 4, instead of a current-voltage conversion means and a comparator to trigger the thyristor 6, there may be employed a photo-coupling means comprising a photoemissive diode PD provided in parallel to the resistor R1 in the circuit of the armature 2a and a phototransistor Ptr which is positioned to receive light emitted by the photodiode PD, the collector of which is connected to the power line L2, and the emitter of which is connected to the gate of the thyristor 6 and through a resistor R10 to the power line L1. In this circuit, when the current flowing in the armature 2a increases sharply as described above the photodiode PD emits light and the phototransistor Ptr is made conductive and applies a voltage to the gate of the thyristor 6 to trigger said thyristor 6, after which function the operation of the circuit is the same as described in reference to FIG. 2.

Figure 5:
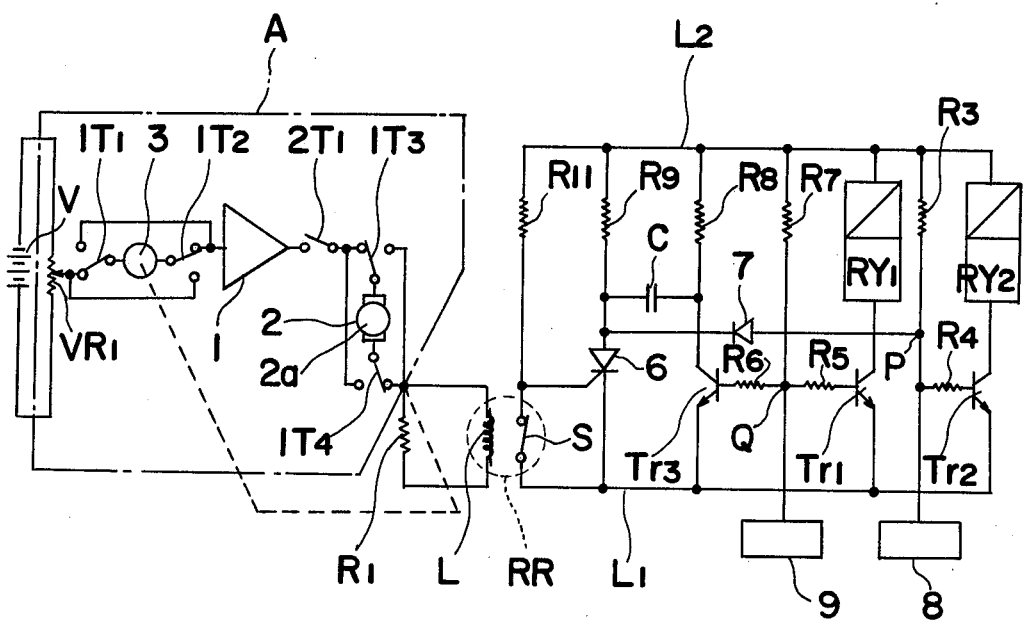

Alternatively, the thyristor 6 may be triggered by a reed relay circuit RR such as shown in the dotted circle in FIG. 5, in which a coil L connected in parallel with the resistor R1 is positioned adjacent a normally closed switch S which is provided in series with a resistor R11 between the power lines L1 and L2. The junction between the switch S and the resistor R11 is connected to the gate of the thyristor 6. In this circuit, the coil L is energized by a sudden rise of the armature current occurring when a film end is reached, and causes the switch S to open, whereby a voltage to trigger the thyristor 6 is applied at the gate thereof.

As is clear from the foregoing description, according to the present invention, in the drive means for a roll film having one end fixed to a reel shaft, there is provided a roll film drive control arrangement which includes means for detecting variations of current flowing through the armature of the motor which drives the drive means, and switching means actuated according to the output of the detecting means for selectively energizing and de-energizing the drive motor, and through detection, by the current variation detecting means, of the increase of the current flowing through the armature of the motor when the end of the film being forwarded has been reached, the switching means is actuated to interrupt the current to the motor for stopping the drive means. Accordingly, special markings or the like on the roll film for detection of the film end are not required, and complicated control mechanism such as a mark detecting circuit, etc. can also dispensed with. The drive control arrangement is thus very useful in actual use and can be applied to any kind of roll films and drive means thereof.

Furthermore, the drive control arrangement according to the present invention can be readily applied to both types of drive means in which one end of the film is fixed to the reel shaft or both ends of the film are secured to such reel shafts, and even when applied to the latter type, no complication of the circuit construction is brought about thereby.

Although the present invention has been fully described by way of example with reference to the accompanying drawings, it is to be noted that various changes and modifications will be apparent to those skilled in the art. Therefore, unless othewise such changes and modifications depart from the scope of the present invention, they should be construed as being included therein.

What is claimed is:

1. A drive control arrangement for use in a drive means for roll wound tape-like material having at least one end thereof fixed to a rotary shaft, said drive control arrangement comprising;

means for detecting variations of electric current flowing through the armature of a motor of said drive means, and switching means to be actuated in response to output of said detecting means for controlling selective energization and de-energization of said motor, said detecting means emitting a signal upon detection of an increase of the electric current flowing through the armature of said motor caused by the increased tension in the tape-like material when said fixed end of the tape-like material has been reached during driving of the tape-like material, said switching means causing said motor to be de-energized upon receipt of the signal from said detecting means for interrupting driving of the tape-like material.

2. A drive control arrangement as claimed in claim 1, wherein said detection means further includes a current-voltage conversion means an producing output voltage proportional to the electric current flowing through said armature and comparator means which compares said output voltage with a reference voltage.

3. A drive control arrangement as claimed in claim 2, wherein said comparator means produces an output which changes when the output voltage of said conversion means becomes greater than said reference voltage.

4. A drive control arrangement as claimed in claim 3, wherein the output produced by said comparator means changes from a low level to a high level when said output voltage of said conversion means becomes greater than said reference voltage.

5. A drive control arrangement as claimed in claim 1, wherein said detection means includes a photoemissive element which emits light upon said increase of the electric current flowing through said armature, and a photosensitive element which receives light emitted by said photoemissive element and produces an output to actuate said switching means upon emission of light by said photoemissive element.

6. A drive control arrangement as claimed in claim 1, wherein said detection means includes a reed relay which is actuated to actuate said switching means in response to said increase of the electric current flowing through said armature.

7. A drive control arrangement as claimed in claim 4, wherein said switching means includes a relay which is actuated in response to said change of the output of said detection means and which has a contact which is openable to de-energize said motor.

8. A drive control arrangement as claimed in claim 1, wherein the tape-like material is movably supported between a first reel and a second reel each having a rotatable shaft, with said tape-like material having one end thereof fixed to said first reel shaft.

9. A drive control arrangement as claimed in claim 1, wherein said tape-like material is movably supported between a first reel and a second reel each having a rotatable shaft, with said tape-like material having one end thereof fixed to said first reel shaft and the other end thereof fixed to said second shaft.

10. A drive control arrangement for use in a drive means for a roll film having at least one end thereof fixed to a rotary shaft, said drive control arrangement comprising;

means for detecting variations of electric current flowing through the armature of a motor of said drive means, switching means to be actuated in response to output of said detecting means for de-energizing said motor, and resetting means actuable to terminate the output of said detecting means and to cause said motor to rotate in a reverse direction, said detecting means emitting a signal upon detecting an increase of the electric current flowing through the armature of said motor caused by increased tension in the roll film when said fixed end of the roll film has been reached during driving of the roll film, said switching means causing said motor to be de-energized upon receipt of the signal from said detecting means for interrupting driving of the roll film, and said output of said detecting means being terminated through actuation of said resetting means, with said motor being simultaneously caused to rotate in the reverse direction for rewinding the roll film.

* * * * *